US012783219B2

(12) United States Patent
Tacke et al.

(10) Patent No.: US 12,783,219 B2
(45) Date of Patent: Nov. 3, 2026

(54) EVALUATING PATH EXPRESSIONS ON BINARY-ENCODED DOCUMENTS

(71) Applicant: Oracle International Corporation, Redwood Shores, CA (US)

(72) Inventors: Aaron Tacke, Redwood Shores, CA (US); Altin Alickaj, Zurich (CH); Giacomo Fabris, Redwood Shores, CA (US); Alexander Ulrich, Freiburg (DE)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 18/630,432

(22) Filed: Apr. 9, 2024

(65) Prior Publication Data

US 2025/0147741 A1 May 8, 2025

Related U.S. Application Data

(60) Provisional application No. 63/597,209, filed on Nov. 8, 2023.

(51) Int. Cl.

*G06F 8/41* (2018.01)
*G06F 16/903* (2019.01)
*G06F 40/14* (2020.01)

(52) U.S. Cl.

CPC ........ *G06F 8/427* (2013.01); *G06F 16/90335* (2019.01); *G06F 40/14* (2020.01)

(58) Field of Classification Search

CPC .... G06F 8/427; G06F 40/14; G06F 16/90335; G06F 16/9027; G06F 16/24534; G06F 16/25

(Continued)

(56) References Cited

U.S. PATENT DOCUMENTS

| | | | | |
|---|---|---|---|---|
| 7,774,321 B2 * | 8/2010 | Tomic | G06F 40/226 | 707/690 |
| 7,885,980 B2 * | 2/2011 | Tarachandani | G06F 16/2228 | 707/802 |

(Continued)

FOREIGN PATENT DOCUMENTS

| | | | | |
|---|---|---|---|---|
| CN | 114547236 A | * | 5/2022 | G06F 40/30 |
| KR | 101904911 B1 | * | 10/2018 | G06F 11/28 |
| KR | 20190041912 A | * | 4/2019 | G06F 11/3688 |

OTHER PUBLICATIONS

Liu et al., "Native JSON Datatype Support: Maturing SQL and NoSQL Convergence in Oracle Database", Proceedings of the VLDB Endowment, vol. 13, No. 12, Aug. 2020, pp. 3059-3071. (Year: 2020).*

(Continued)

*Primary Examiner* — Phuong Thao Cao
(74) *Attorney, Agent, or Firm* — Hickman Becker Bingham Ledesma LLP

(57) ABSTRACT

The present disclosure relates to improving the performance of evaluating path expressions on hierarchical data objects represented by binary encoded documents. An abstract syntax tree (AST) representing a path expression may be generated, wherein the AST comprises one or more syntax nodes implementing one or more respective execution steps of an evaluation of the path expression, and the path expression is included in a query to a database management system (DBMS). The AST may be modified based at least in part on profiling information and compiled into machine code. Using the machine code, the path expression may be executed on a binary-encoded hierarchical document.

18 Claims, 5 Drawing Sheets

(58) Field of Classification Search
USPC .......................................................... 707/803
See application file for complete search history.

(56) References Cited

U.S. PATENT DOCUMENTS

| | | | | |
|---|---|---|---|---|
| 8,024,325 | B2 * | 9/2011 | Zhang | G06F 16/24542 707/718 |
| 8,583,623 | B2 * | 11/2013 | Harbarth | G06F 16/835 707/758 |
| 8,918,412 | B1 * | 12/2014 | Jesurum | G06F 16/3332 707/760 |
| 10,262,012 | B2 * | 4/2019 | Liu | G06F 16/86 |
| 10,838,959 | B2 * | 11/2020 | Bae | G06F 16/258 |
| 11,294,894 | B2 * | 4/2022 | Fender | G06F 16/20 |
| 11,385,889 | B2 * | 7/2022 | Fender | G06F 16/25 |
| 2006/0059184 | A1 * | 3/2006 | Narsude | G06F 16/80 |
| 2008/0091649 | A1 * | 4/2008 | Lim | G06F 16/835 |
| 2009/0327242 | A1 * | 12/2009 | Brown | G06F 16/24549 |
| 2010/0153933 | A1 * | 6/2010 | Bohlmann | G06F 8/73 717/144 |
| 2011/0047143 | A1 * | 2/2011 | Hammerschmidt | G06F 16/8365 707/E17.131 |
| 2015/0081988 | A1 * | 3/2015 | Bonetta | G06F 9/38 711/155 |
| 2015/0134670 | A1 * | 5/2015 | Liu | G06F 16/2246 707/741 |
| 2017/0060912 | A1 * | 3/2017 | Liu | G06F 16/2255 |
| 2018/0196943 | A1 * | 7/2018 | Coroiu | H04W 12/128 |
| 2018/0293276 | A1 * | 10/2018 | Bae | G06F 16/258 |
| 2020/0210398 | A1 * | 7/2020 | Liu | G06F 16/283 |
| 2021/0064613 | A1 | 3/2021 | Fender et al. | |
| 2021/0064619 | A1 * | 3/2021 | Fender | G06F 16/24535 |
| 2021/0117611 | A1 * | 4/2021 | Liu | G06F 16/2282 |
| 2021/0126841 | A1 * | 4/2021 | St. Pierre | H04L 43/045 |
| 2021/0173621 | A1 * | 6/2021 | Fender | G06F 8/71 |
| 2025/0061112 | A1 * | 2/2025 | Mihaylov | G06F 16/24549 |

OTHER PUBLICATIONS

Oracle Database, “SQL/JSON Path Expression”, available: https://docs.oracle.com/en/database/oracle/oracle-database/21/adjsn/json-path-expressions.html, retrieved Apr. 9, 2024.
Oracle Database Insider, “Autonomous JSON Database under the Covers: OSON format”, available: https://blogs.oracle.com/database/post/autonomous-json-database-under-the-covers-oson-format; retreived Apr. 9, 2024.
Liu et al., “Native JSON Datatype Support: Maturing SQL and NoSQL convergence in Oracle Database”, PVLDB, 13(12) : 3059-3071, 2020.
IBM Developer, “Streams Under the Hood”, available: https://www.json.org/json-en.html, retreived Apr. 9, 2024.
“Introducing JSON”, available: https://www.json.org/json-en.html, retrieved Apr. 9, 2024.
Bonetta et al.; FAD.js: Fast JSON Data Access Using JITbased Speculative Optimizations, 2017 VLDB Endowment , vol. 10, No. 12; Aug. 1, 2017, 12 pages.

* cited by examiner

```
exec($):
  // check assumptions
  pos = getPos($, 3)
  return getChild(pos)
```

EVALUATING PATH EXPRESSIONS ON BINARY-ENCODED DOCUMENTS

RELATED APPLICATION DATA AND CLAIM OF PRIORITY

This application claims the benefit of U.S. Provisional Application No. 63/597,209, filed Nov. 8, 2023, the entire contents of which is hereby incorporated by reference as if fully set forth herein, under 35 U.S.C. § 119 (e).

TECHNICAL FIELD

The present disclosure relates to evaluating path expressions on binary-encoded documents.

BACKGROUND

Hierarchical data objects like JavaScript Object Notion (JSON) documents are supported as a data type in databases for storing semi-structured data. Hierarchical data objects are textual representations of data that can include nested objects containing name and value pairs, arrays containing values, and scalar data. While hierarchical data objects are organized using concepts such as arrays and objects, there is usually no fixed schema to which a hierarchical data object must adhere.

Hierarchical data object path expressions are used to extract values or to check for the existence of specific data in hierarchical data object. Many database management systems (DBMSs) offer functionality for evaluating path expressions on hierarchical data objects stored in their database tables. Existing path expression engines, however, experience latency and throughput issues that detract from their usefulness.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
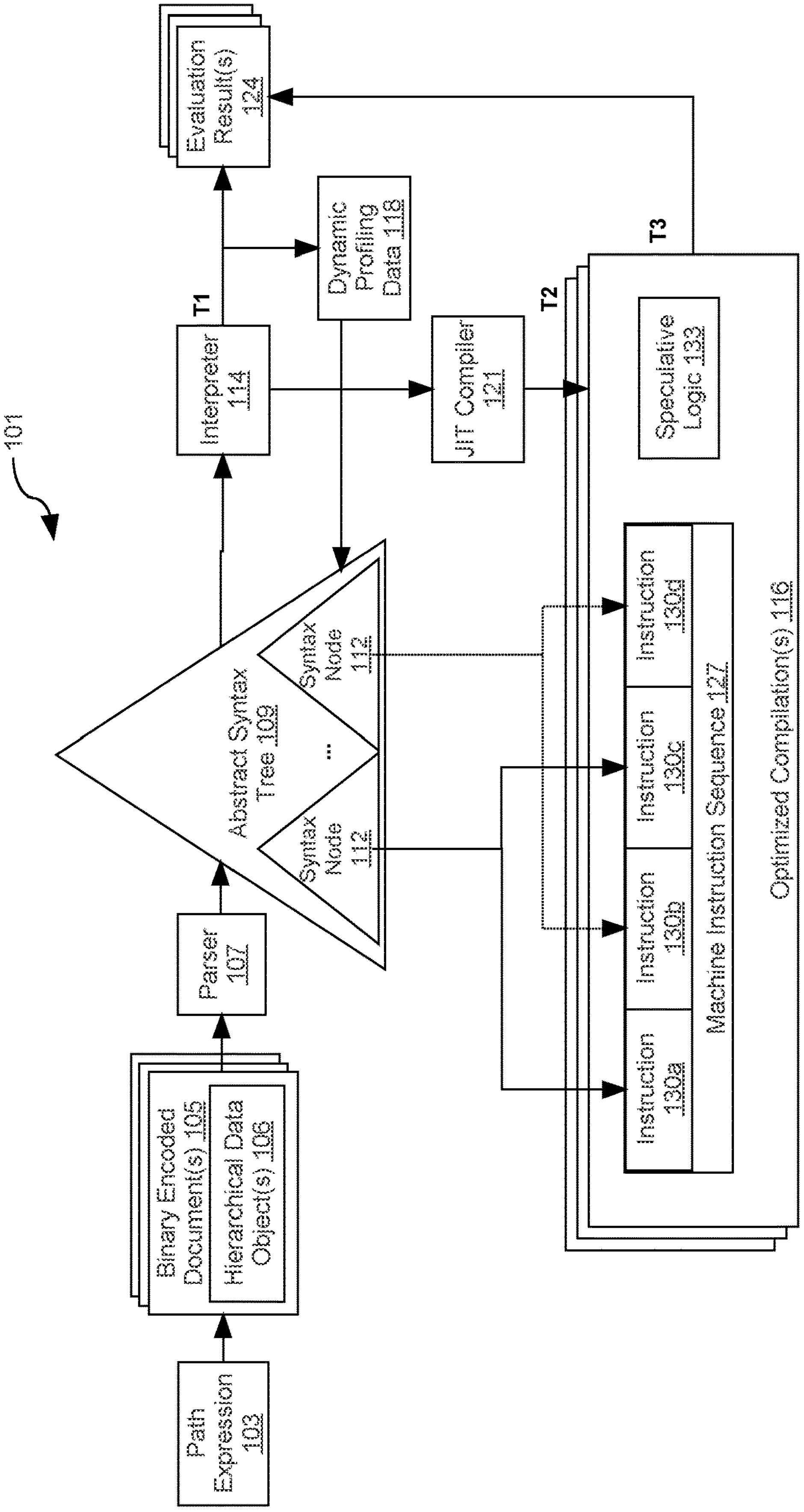
FIG. 1 is a block diagram that shows an example path expression engine, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to improving the performance of evaluating path expressions on hierarchical data objects represented by binary encoded documents. While hierarchical data objects may not have an explicit schema, hierarchical data objects within a same domain may share data shape characteristics. This similarity of data shape may be exploited while maintaining the schema-less nature of the hierarchical data objects. To that end, machine code may be generated that may make assumptions about data shape of the hierarchical data objects, invalidate any of those assumptions that are incorrect, and adapt to changes in the input hierarchical data objects. The term "data shape" or "shape" is used herein to mean the structure and format of a hierarchical data object, including, for example, the type of data represented by the hierarchical data object, the organization and relationships of data, the cardinality of the data, and other characteristics and properties that define how the data is structured and organized.

Data from a hierarchical data object may be stored in a binary-encoded document, which may be a tree encoding of the hierarchical data object. The binary-encoded document may store field names of objects from the hierarchical data object in a dictionary which is used to omit duplicates of field names. The dictionary may map a unique numeric field identifier to each field name in a data object. Because a dictionary is contained within a binary encoded data object, the dictionary may be referred to as an inline dictionary. The fields within the hierarchical data object are stored as an encoded hierarchical tree. The hierarchical structure of identically structured objects may be determined and stored once, thereby enabling efficient navigation through the encoded tree using field identifiers without accessing unnecessary portions or scanning the whole hierarchical data object. Scalar values from the hierarchical data object may be stored using existing data formats to enable quick comparison and extraction of values from the hierarchical data object. Alternatively, scalar values of an encoded data object may be mapped by an inline dictionary and encoded accordingly. The binary-encoded document may include a header that sets various parameters like, for instance, variable size. Binary-encoded documents are discussed in detail in U.S. patent application Ser. No. 14/836,680, filed Aug. 26, 2015, which is incorporated by reference herein in its entirety.

To evaluate a path expression on a hierarchical data object represented by a binary-encoded document, the path expression may be compiled to optimized machine code. At runtime, a "just-in-time" (JIT) compiler may employ speculative logic to generate the optimized machine code, which may be specialized to that path expression and data shapes of one or more hierarchical data objects. The speculative logic may be based on assumptions about the input and environment of the computational task of evaluating the path expression. While these assumptions could be incorrect, the assumptions are made speculatively based on profiling data collected during previous evaluations of the path expression over one or more hierarchical data objects. The resulting optimized machine code may employ partial evaluation of one or more portions of the path expression combined with speculation over the shape of the hierarchical data object data.

The optimized machine code may be capable evaluating the path expression over one or more hierarchical data objects while using less CPU and memory usage than non-optimized execution. Thus, the optimized machine code may improve performance by, for example, reducing latency between issuance of the command to perform evaluation of the path expression and the result of that evaluation. Thus, the optimized machine code may produce results for the path expression more quickly than existing evaluators for hierarchical data object path expressions.

Path Expression Engine

FIG. 1 is a block diagram that shows an example path expression engine 101, in an embodiment. The path expression engine 101 may be executed to evaluate path expressions 103. Evaluating the path expression 103 may include, for example, parsing the path expression 103 and executing the parsed path expression 103 on a binary-encoded document 105 representing a hierarchical data object 106 and obtaining an evaluation result 124 of the execution.

The path expression engine 101 may parse a particular path expression once 103, while the path expression engine 101 may execute the path expression 103 per binary-encoded document 105 on which the path expression 103 is evaluated. Tasks that are independent of executing the path expression 103 on a binary-encoded document 105 may be performed during parsing. Performing these tasks during parsing of the path expression 103 rather than execution of the path expression 103 may prevent the tasks from being repeated each time the path expression is executed on a binary-encoded document 105. For example, hash values of field names in the path expression 103 or conversion to efficiently comparable data types may be performed when the path expression 103 is parsed.

The path expression engine 101 may execute path expression 103 and return one or more evaluation results 124. The evaluation results 124 may be generated in fulfilment of the path expression 103. Evaluation result(s) 124 may include one value matching the path expression 103 in the binary-encoded document 105, all matching values, or the existence of any matching values, depending on which operator is used.

Abstract Syntax Tree

A result of parsing a path expression 103 may be the AST 109. The AST 109 may comprise one or more syntax nodes 112 that represent execution steps for evaluating the path expression 103 (that is, executing the parsed path expression 103). The AST 109 may include a node for each object, array, descendant, or function step, as well any filter expressions in the path expression 103. In addition, the return type specified for the path expression 103—which may function as a termination condition for evaluating the path expression—may be represented as a node in the AST 109.

For example, when parsing a path expression 103 like "$items.*[*]", a corresponding AST 109 would comprise a first syntax node 112 for targeting the value of the "items" field, a second syntax node 112 for the wildcard field access targeting the values of all fields of an object, and a third syntax node 112 for targeting all values of an array. These syntax nodes 112 may not be executed simply one after another, though. To illustrate, the second syntax node 112 would entail collecting the values of all fields in a separate container to be passed to the next syntax node 112. But this is not only too memory intensive, but it also prohibits lazy evaluation-since all values would be evaluated even if the first value evaluated would be sufficient to execute the path expression 103. Instead, single values may be passed from one syntax node 112 to another without using data structures to finish execution of the path expression 103 as soon as possible.

In some implementations, Oracle Truffle may parse path expression 103 to generate the AST 109. A domain-specific language (DSL) may be implemented using Truffle through an AST interpreter. DSL elements may be mapped to syntax nodes 112 of the AST 109 implemented according to the Truffle language framework. Each syntax node 112 may have an execute method that implements the logic of its corresponding DSL element. To execute the language program, the Truffle language framework may invoke a language parser. The Truffle language parser may, for each parsed DSL element, instantiate a syntax node 112 and link the syntax nodes 112 to instantiate the AST 109.

An Oracle technology stack may include Truffle, Graal, Substrate, and a Java virtual machine (JVM). Such a tool chain may provide robust optimizations such as partial evaluation, AST rewriting, JIT compilation, dynamic profiling, datatype inferencing, and speculative logic, as discussed herein.

Interpretation of the Ast

The path expression engine 101 may initially implement execution of the path expression 103 by plain interpretation of the AST 109. At time T1, the path expression engine 101 may cause an interpreter 114 to interpret the execution steps represented by the syntax nodes 112 of the AST 109. The interpreter 114 may thereby evaluate the path expression 103 over one or more binary-encoded documents 105 representing one or more respective hierarchical data objects 106. In some implementations, a Truffle language program may be executed by interpretation, which may entail invoking the execute method of the AST's 109 root node. The root node's execute method may invoke the execute methods of the root node's child node(s). This process may recur for the children of those nodes in a top-down, depth-first manner.

During plain interpretation of the AST 109, the path expression engine 101 may collect dynamic profiling data 118 related to input hierarchical data objects 106. For example, the interpreter 114 may be accompanied by mechanisms (e.g., instrumentation) so that dynamic profiling data 118 may be recorded while the interpreter 114 is executed. Thus, interpretation of the AST 109 may cause one or more evaluation results 124 and dynamic profiling data 118 to be generated. The dynamic profiling data 118 may comprise information such as, for example, observed datatypes for datatype inferencing for generating speculative logic, and execution frequency such as with basic blocks or individual instructions, such as for dead code elimination or hotspot detection such as tight loops.

Generating the Optimized Compilation

At time T2, the path expression engine 101 may cause generation of an optimized compilation. Once the dynamic profiling data 118 is collected from one or more executions of the interpreter 114, the dynamic profiling data 118 may be used to rewrite the AST 109 to incorporate one or more specializations; the rewritten AST 109 may then be used to compile an optimized compilation 116. The interpreter 114 may continue to execute in a main thread while compilation of the optimized compilation 116 may occur in a background thread. Once the compilation process terminates, the background thread may feed data into a foreground thread so that the optimized compilation 116 may be implemented and executed.

A JIT compiler 121 may use the dynamic profiling data 118 to compile the AST 109 into an optimized compilation 116. For example, the JIT compiler 121 may be the Graal JIT compiler. The optimized compilation 116 may therefore be produced through the usage of the Truffle language framework and the Graal JIT compiler.

The optimized compilation 116 may be executed to evaluate the path expression 103 more efficiently according to one or more speculative assumptions underlying the specializations incorporated into the AST 109. The optimized compilation 116 may incorporate speculative logic 133 that reflects these specializations, speculative assumptions, partial evaluation, and other optimizations.

Speculative Logic

Speculative logic 133 may be based on the dynamic profiling data 118. The speculative logic 133 may include one or more specializations based on observed input data, which may include global properties of binary-encoded document(s) 105. For example, the speculative logic 133 may include a specialization on the global sizes of variables. If input binary-encoded documents 105 tend to have a field identifier size of, say, two bytes, then the AST 109 may be specialized to directly access the bytes for field identifiers in the binary-encoded document based on the observed global variable size. This specialization may avoid checking the variable size of field identifiers each time a hierarchical data object is processed, which could involve performing a binary search. As another example, the speculative logic 133 may include a specialization on caching a result of a binary search of a field name list in a header of the binary-encoded document 105. Using this cached result, the AST 109 may be specialized to start subsequent binary searches at the position of the cached result. To give an additional example the speculative logic 133 may include a specialization on the absence of hash collisions. That is, the AST 109 may exclude an execute method to deal with hash collisions between strings in a binary-encoded document 105. As a further example, the speculative logic 133 may include a specialization on caching header values of a binary-encoded document 105. The header of a binary-encoded document 105 may include one or more global properties having values that may be cached. If these values tend to be used during path evaluation, they may be "inlined" in the AST 109.

The speculative logic 133 may also include one or more specializations based on local properties of binary-encoded documents 105. An example of such a specialization may be speculation on the local sizes of variables. To illustrate, the speculative logic 133 may speculate that the length of each offset in an array or object is of a fixed size. In that case, the variable may be directly accessed without checking their lengths. To illustrate further, another specialization may include speculation on the "shape" of particular values. For example, a specialization can add or remove an implicit array cast depending on the presence or absence of arrays in some portion of the input binary-encoded documents 105. As another example, a specialization may be based on whether an object of the binary-encoded documents 105 uses field identifier sharing. An object may use field identifier sharing if the object references another object of a similar structure for its list of field identifiers. The object storing the field identifiers may be cached. As another example, a specialization may, in cases where arrays in input binary-encoded documents 105 tend to have a size of one, include checking once whether an array's indices contain "0" or "last". As a further example, depending on the maximum size of scalar values in input binary-encoded documents 105, a specialization may include using primary data types in place of arbitrary-precision arithmetic.

The speculative logic 133 may further include inlining, partially evaluating, and compiling constant parts of the path expression 103 (e.g., steps and literals in the path expression 103). Partial evaluation may include speculatively applying an assumption to the AST 109 and computing the corresponding a portion of the AST 109 at compile time, instead of at run time. For example, partial evaluation may include eliminating branches of the AST 109 that are rendered unnecessary by a particular speculative assumption, or performing constant folding-evaluating any expressions that involve only constants. If particular features of the path syntax are not used in the path expression 103, then constant flags may be used so that branches of the AST 109 that would cover these features may be eliminated to simplify the machine code created for the respective syntax node 112 during partial evaluation.

The speculative logic 133 may be accompanied by guards for deoptimization when a speculative assumption is invalidated. For example, execution may return to the interpreter 114 or an alternative optimized compilation 116 if a speculative assumption is invalidated. Otherwise, at time T3, the optimized compilation 116 may execute successfully to evaluate the path expression 103 and generate an evaluation results 124.

Invalidated Speculative Assumptions

In some implementations, execution may revert to the interpreter 114 if any speculative assumptions are invalidated (that is, an input binary-encoded document 105 exhibits one or more properties that are incompatible with one or more of the assumptions). In some implementations, the JIT compiler 121 may recompile the AST 109 with a weaker set of speculative assumptions if one or more speculative assumptions fails. In other implementations, multiple different versions of the optimized compilation 116 may be cached, with each different version corresponding to a different speculative assumption.

The path expression engine 101 may collect additional dynamic profiling data 118 when an input binary-encoded document 105 invalidates one or more speculative assumptions underlying the optimized compilation 116. Previously, the optimized compilation 116 may have been specialized on one or more speculative assumptions derived from one or more observed properties of previous input binary-encoded document 105. But a subsequent input binary-encoded document 105 may include one or more properties that are inconsistent with the one or more observed properties of the previous input binary-encoded document 105 and therefore invalidate the one or more speculative assumptions. The path expression engine 101 may then collect additional dynamic profiling data 118 that indicates the one or more properties of the subsequent input binary-encoded document 105.

The JIT compiler 121 may compile a further version of the optimized compilation 116 that is specialized on one or more additional speculative assumptions derived from the one or more properties of the subsequent input binary-encoded document 105. This further iteration of the optimized compilation 116 may be cached together with the previous version of the optimized compilation 116 that is based on the one or more speculative assumptions from the previous input binary-encoded document 105. Then, execution may be dispatched to the relevant version of the optimized compilation 116.

For example, suppose optimized compilation 116 has been specialized to speculate on a first global variable size that has been observed within previous input hierarchical data objects 106. Subsequent input binary-encoded documents 105 having a different, second global variable size would therefore invalidate the speculative assumption derived from the first global variable size. The JIT compiler 121 may compile a further optimized compilation 116 that is specialized on the second global variable size, in addition to the previous optimized compilation 116 that is specialized on the first global variable size. The path engine 101 may therefore execute the previous optimized compilation 116 to evaluate binary-encoded documents 106 determined to have the first global variable size, while the further optimized compilation 116 may be executed to evaluate binary-encoded documents 105 determined to have the second global variable size.

Accessing Binary-Encoded Documents

A binary-encoded document 105 may be accessed by a parser 107 that is JIT-compatible. The parser 107 may offer a generic implementation that supports the feature set of binary encoding while caching properties of the observed binary-encoded documents 105 that may remain unchanged for similarly-structured binary-encoded documents 105. For example, the parser 107 may cache properties such as whether the binary-encoded document dictionary will be smaller than 65 kB, or the used size for hash values of field names. Assuming that these cached properties are constant, partial evaluation may specialize the execution and result in optimized machine code for the parser 107 to access hierarchical data object 106 data encoded in binary-encoded documents 105 on a byte level.

Rewriting the AST 109 to remove unnecessary branches and the specialization of the binary-encoded document 105 parsing code—both of which may be inlined into one execution—may result in efficient machine code that is specialized to the path expression 103 and the hierarchical data object 106. Depending on the cardinality of data being processed for each path expression 103, the increased efficiency of the parser machine code may offset the costs incurred by the JIT compilation and result in a higher-performing path expression engine 101.

Example of Specialization on Observed Input Data

Figures 2A, 2B, 2C:
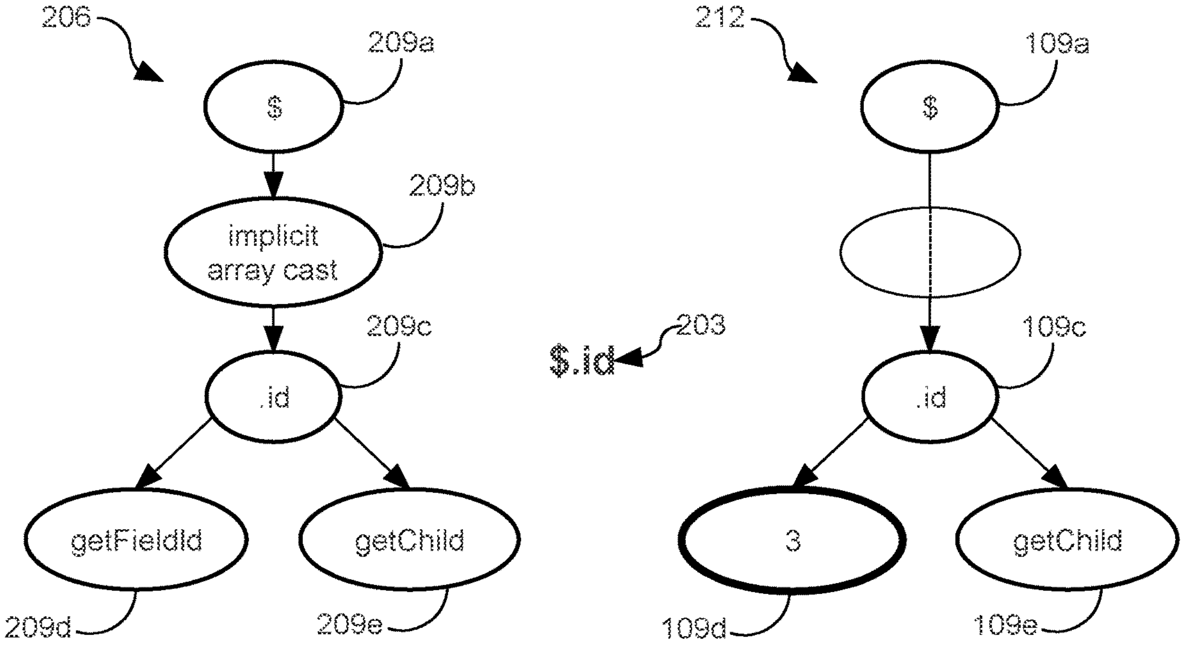
FIG. 2A shows an example of an abstract syntax tree corresponding to an example path expression, in an embodiment.
FIG. 2B shows an example of an optimized AST following specialization on a path expression and one or more input hierarchical data objects, in an embodiment.
FIG. 2C shows an example representation of an optimized compilation 215, in an embodiment.

FIG. 2A shows an example of an AST corresponding to an example path expression 203, "$.id", in an embodiment. The path expression 203 may be represented as an AST 206, where each node 209 in the AST 206 corresponds to an execute method for evaluating the path expression 203. The path expression 203 targets a value of a field named "id". In the AST, root node 209*a* is the root of the AST and likewise represents the root object of a hierarchical data object. Supposing root node 209*a* is the context node, child node 209*b* represents an implicit array cast execute method, which may determine whether a cast from an array to an object is performed. Grandchild node 209*c* represents an execute method to identify the field name "id" in the hierarchical data object. Great-grandchild node 209*d* represents an execute method to look up a field identifier for the field name "id", and great-grandchild node 209*e* represents an execute method to access the value of the "id" field.

FIG. 2B shows an example of an optimized AST 212 following specialization on the path expression and one or more input hierarchical data objects. The path expression 203 may be executed on the one or more hierarchical data objects according to the AST. During that execution, a path expression engine collects profiling data about the characteristics of the one or more hierarchical data objects with respect to the path expression. Suppose that the profiling data indicates that the implicit array cast of node 209*b* is not used. In that case, node 209*b* may be removed from the optimized AST 212. Thus, when executing the path expression 203 according to the optimized AST 212, the implicit array cast step may be skipped. In addition, suppose that the profiling data indicates that the field identifier for the field name "id" is always 3 in the one or more hierarchical data objects. Then, great-grandchild node 209*d* may be modified in the optimized AST 212 to assume that the field identifier for the field name "id" is 3. Thus, when executing the path expression 203 according to the optimized AST 212, the path engine may determine whether assumption that the field identifier for the field name "id" is 3 remains correct, rather than performing a new dictionary lookup.

FIG. 2C shows an example representation of an optimized compilation 215, in an embodiment. The optimized compilation 116 215 may result from compiling the optimized AST 212. The optimized compilation 116 may be used to execute the steps of the optimized AST 212 on hierarchical data objects that are similar to the hierarchical data objects used to collect the profiling information. If, however, one of the assumptions does not hold for a hierarchical data object, either two different optimizations may be used, or execution may be de-optimized. For example, suppose that one hierarchical data object has an "id" field name with a field identifier of 4 instead of 3. In some implementations, a second optimization assuming that the field identifier of the "id" field name is 4 may be added to the optimized AST 212 and optimized compilation 215, together with an execute method to determine which optimization (assuming the field identifier of the "id" field name is 3 or assuming that it is 4) to use. In other implementations, the optimized AST 212 may be deoptimized at node 209*d* to look up the field identifier of the "id" field.

Example Process for Generating Optimized Compilation 116

Figure 3:
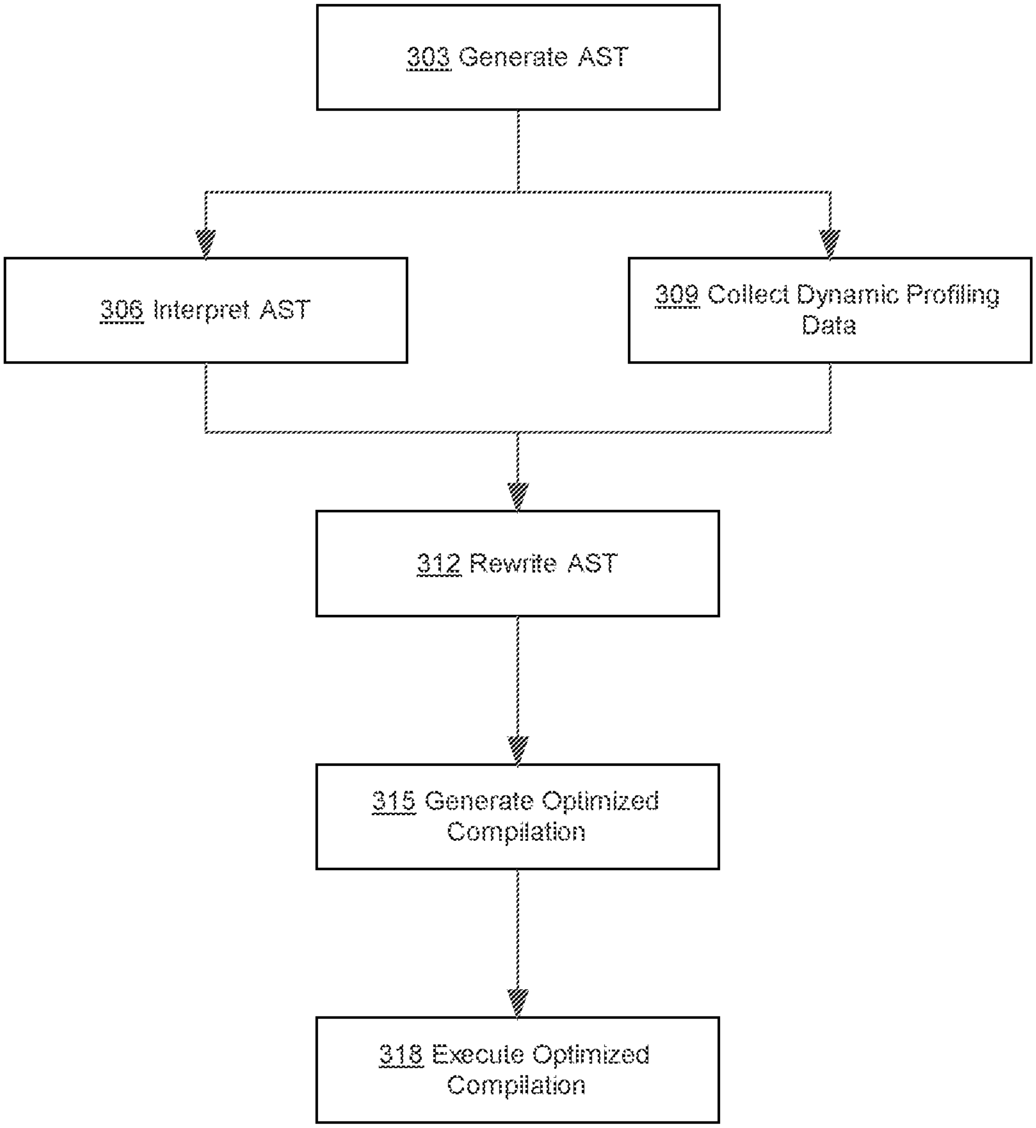
FIG. 3 is a flow diagram that depicts an example process performed by a path expression engine for generating an optimized compilation based on a path expression, in an embodiment.

FIG. 3 is a flow diagram that depicts an example process performed by the path expression engine 101 for generating optimized compilation 116 based on a path expression 103, in an embodiment. The flow diagram of FIG. 3 provides merely an example of the many different types of functional arrangements that may be employed to implement the operation of the depicted portion of the path expression engine 101.

At step 303, the path expression engine 101 may generate an abstract syntax tree (AST) 109. A path expression 103 may be parsed to generate the AST 109. In some implementations, the AST 109 may be generated by parsing the path expression 109 using Oracle Truffle. The AST 109 may include one or more nodes, each of which represents an execute method in the process of evaluating the path expression 103.

At step 306, the path expression engine 101 may interpret the AST 109. For example, the path expression engine 101 may execute an interpreter 114 to evaluate the path expression 103 over one or more binary-encoded documents 105 represented by one or more respective hierarchical data objects 106. The interpreter 114 may traverse the AST 109 beginning with a root syntax node 112. At each syntax node 112, the interpreter 114 may invoke an execute method represented by that syntax node 112 to perform a corresponding step in a process for evaluating the path expression 103.

At step 309, the path expression engine 101 may collect dynamic profile data 118 from interpretation of the AST 109. For example, the interpreter 114 may record data such as variable sizes observed in the one or more evaluated binary-encoded documents 105, data types, binary search results, header values, offset lengths in arrays and/or objects, and other global and local properties of the one or more binary encoded documents 105, which may include properties of the corresponding one or more hierarchical data objects 106 and the data therein. The path expression engine 101 may cache this data as dynamic profiling data 118. Steps 306 and 309 may occur concurrently at time T1 as shown in FIG. 1.

At step 312, the path expression engine 101 may rewrite the AST 109. The AST 109 may be rewritten to incorporate one or more specializations. These specializations may be based on properties of the one or more binary-encoded documents 105 observed during evaluation by the interpreter 114, which are reflected in the dynamic profiling data 118.

At step 315, the path expression engine 101 may generate an optimized compilation 116. For example, at time T2 in FIG. 1, an optimized compilation 116 may be generated based at least in part on the AST 109 and the dynamic profiling data 118. A JIT compiler 121 may use the dynamic profiling data 118 to compile the rewritten AST 109 into an optimized compilation 116. When generating the optimized compilation 116, the JIT compiler 121 may perform partial evaluation by computing a portion of the rewritten AST 109 at compile time. Partial evaluation may include computing (and thus eliminating) one or more branches of the AST 109 or performing constant folding.

At step 318, the path expression engine 101 may execute the optimized compilation 116. For example, the optimized compilation 116 may be executed at time T3 as shown in FIG. 1 to evaluate the path expression 103 over the one or more binary-encoded documents 105 in an optimized manner. Executing the optimized compilation 116 may therefore result in one or more evaluation results 124.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
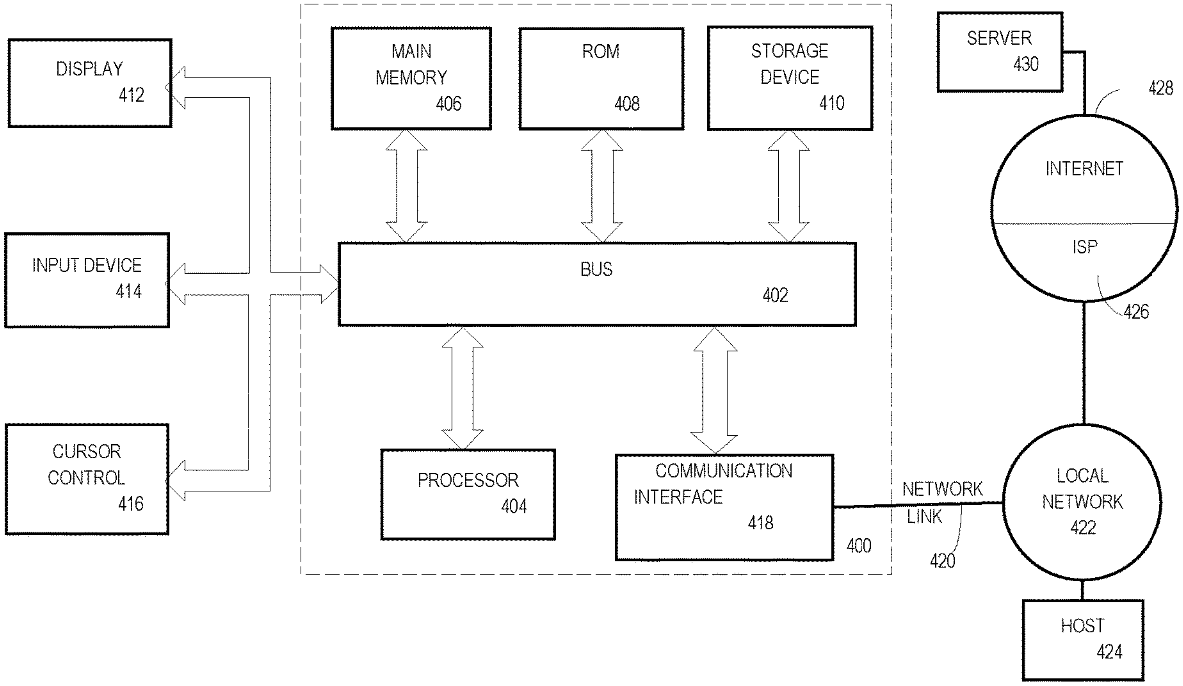
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
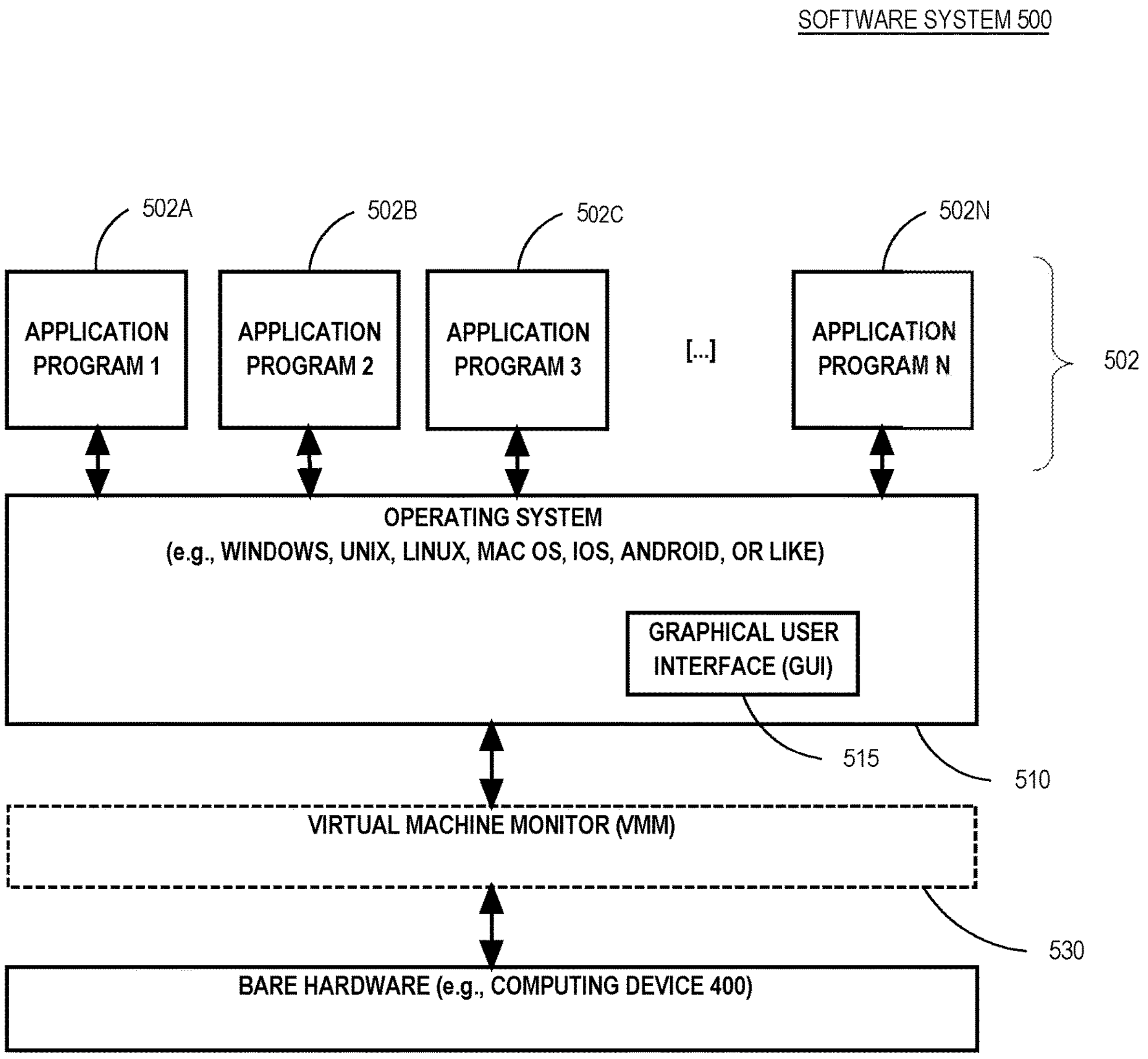
FIG. 5 is a block diagram of a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
- generating an abstract syntax tree (AST) representing a path expression, wherein the AST comprises one or more syntax nodes implementing one or more respective execution steps of an evaluation of the path expression, and the path expression is included in a query to a database management system (DBMS);
- performing a plain interpretation of the AST on a second binary encoded hierarchical document;
- collecting, from the plain interpretation of the AST, profiling information that comprises at least one of:
  - a cached header value of a header of the second binary encoded hierarchical document,
  - an indication that an array in the second binary encoded hierarchical document having a size of one, or
  - a cached object in the second binary encoded hierarchical document that stores a field identifier that is referenced by another object in the second binary encoded hierarchical document;
- modifying the AST based at least in part on the profiling information;
- compiling the AST into machine code; and
- executing, using the machine code, the path expression on a first binary encoded hierarchical document;
- wherein the method is performed by one or more computing devices.

2. The method of claim 1, wherein:
- the first binary encoded hierarchical document represents a hierarchical data object comprising a plurality of field names;
- the first binary encoded hierarchical document comprises an inline dictionary that maps field names of the hierarchical data object to field name identifiers of the hierarchical data object.

3. The method of claim 1, wherein the first binary encoded hierarchical document represents a hierarchical data object comprising a plurality of field names, wherein the first binary encoded hierarchical document comprises:
- a hash-code mapping that maps a hash code corresponding to a field name of the plurality of field names to a field name identifier,
- a field-name mapping that maps the field name to the field name identifier,
- a child node mapping that maps a node to one or more child nodes, wherein the node and the one or more child nodes represent field names of the hierarchical data object, and
- a field-name-identifier-to-child mapping that maps the field name identifier to the one or more child nodes.

4. The method of claim 1, wherein the first binary encoded hierarchical document represents a JSON document.

5. The method of claim 1, wherein compiling the AST into machine code further comprises partially evaluating one or more constant expressions of the AST.

6. The method of claim 1, wherein the AST is compiled into machine code using a just-in-time (JIT) compiler.

7. The method of claim 1, wherein the profiling information comprises at least one of:
- a predetermined size of a variable in the second binary encoded hierarchical document, a cached field identifier from the second binary encoded hierarchical document, or a maximum size of a scalar value in the second binary encoded hierarchical document.

8. The method of claim 7, wherein modifying the AST based at least in part on the profiling information further comprises at least one of:
- modifying a first syntax node of the AST, which implements identifying a value from a header of a binary encoded hierarchical document that can be the first binary encoded hierarchical document or the second binary encoded hierarchical document, to implement inlining the cached header value;
- modifying a second syntax node of the AST, which implements evaluating index ranges of one or more arrays from the binary encoded hierarchical document, to implement determining whether indexes of the one or more arrays contain "0" or "last" based on the array having a size of one in the profiling information;
- modifying a third syntax node of the AST to replace a variable-precision scalar data type in the binary encoded hierarchical document with a primitive data type based at least in part on the maximum size of the scalar value from the profiling information falling below a predetermined threshold; or
- modifying a fourth syntax node of the AST to replace one or more objects that implement field identifier sharing with the cached object that stores a field identifier.

9. The method of claim 1, wherein executing, using the machine code, the path expression on the first binary encoded hierarchical document further comprises:
- determining whether a value that satisfies the path expression exists in the first binary encoded hierarchical document.

10. One or more non-transitory storage media storing instructions which, when executed by one or more computing devices, cause:
- generating an abstract syntax tree (AST) representing a path expression, wherein the AST comprises one or more syntax nodes implementing one or more respective execution steps of an evaluation of the path expression, and the path expression is included in a query to a database management system (DBMS);
- performing a plain interpretation of the AST on a second binary encoded hierarchical document;

collecting, from the plain interpretation of the AST, profiling information that comprises at least one of:
- a cached header value of a header of the second binary encoded hierarchical document,
- an indication that an array in the second binary encoded hierarchical document having a size of one, or
- a cached object in the second binary encoded hierarchical document that stores a field identifier that is referenced by another object in the second binary encoded hierarchical document;

modifying the AST based at least in part on the profiling information;

compiling the AST into machine code; and executing, using the machine code, the path expression on a first binary encoded hierarchical document.

11. The one or more non-transitory storage media of claim 10, wherein:

the first binary encoded hierarchical document represents a hierarchical data object comprising a plurality of field names;

the first binary encoded hierarchical document comprises an inline dictionary that maps field names of the hierarchical data object to field name identifiers of the hierarchical data object.

12. The one or more non-transitory storage media of claim 10, wherein the first binary encoded hierarchical document represents a hierarchical data object comprising a plurality of field names, wherein the first binary encoded hierarchical document comprises:
- a hash-code mapping that maps a hash code corresponding to a field name of the plurality of field names to a field name identifier,
- a field-name mapping that maps the field name to the field name identifier,
- a child node mapping that maps a node to one or more child nodes, wherein the node and the one or more child nodes represent field names of the hierarchical data object, and
- a field-name-identifier-to-child mapping that maps the field name identifier to the one or more child nodes.

13. The one or more non-transitory storage media of claim 10, wherein the first binary encoded hierarchical document represents a JSON document.

14. The one or more non-transitory storage media of claim 10, wherein compiling the AST into machine code further comprises partially evaluating one or more constant expressions of the AST.

15. The one or more non-transitory storage media of claim 10, wherein the AST is compiled into machine code using a just-in-time (JIT) compiler.

16. The one or more non-transitory storage media of claim 10, wherein the profiling information comprises at least one of:
- a predetermined size of a variable in the second binary encoded hierarchical document,
- a cached field identifier from the second binary encoded hierarchical document, or
- a maximum size of a scalar value in the second binary encoded hierarchical document.

17. The one or more non-transitory storage media of claim 16, wherein modifying the AST based at least in part on the profiling information further comprises at least one of:
- modifying a first syntax node of the AST, which implements identifying a value from a header of a binary encoded hierarchical document that can be the first binary encoded hierarchical document or the second binary encoded hierarchical document, to implement inlining the cached header value;
- modifying a second syntax node of the AST, which implements evaluating index ranges of one or more arrays from the binary encoded hierarchical document, to implement determining whether indexes of the one or more arrays contain “0” or “last” based on the array having a size of one in the profiling information;
- modifying a third syntax node of the AST to replace a variable-precision scalar data type in the binary encoded hierarchical document with a primitive data type based at least in part on the maximum size of the scalar value from the profiling information falling below a predetermined threshold; or
- modifying a fourth syntax node of the AST to replace one or more objects that implement field identifier sharing with the cached object that stores a field identifier.

18. The one or more non-transitory storage media of claim 10, wherein executing, using the machine code, the path expression on the first binary encoded hierarchical document further comprises:
- determining whether a value that satisfies the path expression exists in the first binary encoded hierarchical document.

* * * * *